(12) United States Patent
Engel

(10) Patent No.: US 7,616,199 B2
(45) Date of Patent: Nov. 10, 2009

(54) SYSTEM AND METHOD FOR INTERLEAVED SLICE VOLUME RENDERING

(75) Inventor: Klaus Engel, Donauwoerth (DE)

(73) Assignee: Siemens Medical Solutions USA, Inc., Malvern, PA (US)

(*) Notice: Subject to any disclaimer, the term of this patent is extended or adjusted under 35 U.S.C. 154(b) by 482 days.

(21) Appl. No.: 11/481,129

(22) Filed: Jul. 5, 2006

(65) Prior Publication Data

US 2007/0064000 A1    Mar. 22, 2007

Related U.S. Application Data

(60) Provisional application No. 60/718,795, filed on Sep. 20, 2005.

(51) Int. Cl.
*G06T 15/00* (2006.01)
*G06T 17/00* (2006.01)

(52) U.S. Cl. .................... 345/419; 345/420; 345/424

(58) Field of Classification Search .................... None
See application file for complete search history.

(56) References Cited

U.S. PATENT DOCUMENTS 5,570,404 A * 10/1996 Liang et al. .................... 378/8

2002/0005850 A1* 1/2002 Osborne et al. ............. 345/424

OTHER PUBLICATIONS

C. Berger, M. Hadwiger, and H. Hauser, "A Flexible Framework for Hardware-Accelerated High-Quality Volume Rendering", Technical Report TR-VRVis-2003-001, 2003.*
Arie Kaufman and Klaus Mueller, "Volume Visualization and Volume Graphics", Center for Visual Computing, Computer Science Department, Stony Brook University, http://www.cs.sunysb.edu/~mueller/teaching/cse332/volvisChapter.pdf.*
Klaus Engel, Martin Kraus, Thomas Ertl, High-quality pre-integrated volume rendering using hardware-accelerated pixel shading, Proceedings of the ACM SIGGRAPH/EUROGRAPHICS workshop on Graphics hardware, p. 9-16, Aug. 2001, Los Angeles, California, United States [doi>10.1145/383507.383515].*

* cited by examiner

*Primary Examiner*—Ulka Chauhan
*Assistant Examiner*—Daniel F Hajnik
(74) *Attorney, Agent, or Firm*—Donald B. Paschburg; F. Chau & Associates, LLC

(57) ABSTRACT

A method for volume rendering a digitized image includes providing a digitized 3-dimensional image with a plurality of 2-dimensional slices comprised of a plurality of intensities corresponding to a domain of points on a 2-dimensional grid, interleaving said slices so that a predetermined number of slices are represented within 2-dimensional textures comprising slabs. Each said slab comprises a plurality of polygons. Weighting functions are generated for each slice of each polygon of a slab, and using said weighting functions, computing a trilinarly interpolated sample from multiple bilinearly interpolated samples value for each slice of said polygon.

17 Claims, 5 Drawing Sheets

US 7,616,199 B2

SYSTEM AND METHOD FOR INTERLEAVED SLICE VOLUME RENDERING

CROSS REFERENCE TO RELATED UNITED STATES APPLICATIONS

This application claims priority from "INTERLEAVED SLICE VOLUME RENDERING", U.S. Provisional Application No. 60/718,795 of Klaus Engel, filed Sep. 20, 2005, the contents of which are incorporated herein by reference.

TECHNICAL FIELD

This invention is directed to volume rendering of digitized medical images.

DISCUSSION OF THE RELATED ART

This invention is a performance optimization for this inventor's sliding texture invention, "Sliding Texture Volume Rendering", U.S. Patent Application Publication No. 2005/0264578, filed May 19, 2005, the contents of which are incorporated herein by reference. The sliding texture algorithm therein disclosed uses a 2D texture to represent individual slices, and only requires two 2D textures to render a volume of any size. Volumetric data is typically acquired as a series of images (which are also referred to as slices) in the x-y plane and are stored with the same orientation (which is referred to as the native orientation). When the principal viewing direction is along the z-axis (that is, along the native orientation) conventional processing is used in that texture values can be obtained by specifying geometry (typically a rectangle or "quad") indicating the scope for the hardware to perform the interpolation of texture values that are then blended. However, when the principal viewing direction is along either the x-axis or the y-axis then it is necessary to either resample the volumetric data to yield slices along the principle viewing direction, or derive slices on-the-fly. Resampling the data will yield either two or three extra copies of the data set (depending on the number of orientations used). These extra copies of data pose a significant increase to the overall memory requirements of the system (and were a primary motivating factor for developing the sliding texture algorithm). Slices can be dynamically derived using geometry to extract and interpolate data from the actual data. However, to reduce both the amount of texture and geometry used it is only necessary to represent the space between slices as slabs (treating the slices as though they have no thickness), and render the slab polygons comprising the slab.

FIG. 1 illustrates the basic sliding texture algorithm, based on a single channel per texel, where the sequence of vertical lines denote parallel slices. The vertical sequence of rectangles between a pair of slices represents the geometry used to derive mini-slices to be rendered. The dots at the vertices of the rectangles denote the vertices of the geometry that are used to derive the data. Therefore, geometry is used to dynamically construct slab-polygons to be rendered thereby trading off extra copies of the dataset for more computational complexity, since increased memory utilization has an indirect detrimental effect on performance due to caching effects.

SUMMARY OF THE INVENTION

Exemplary embodiments of the invention as described herein generally include methods and systems for optimizing the 2D sliding textures algorithm by interleaving slices into texture thereby reducing the number of texture fetches required, the cost for computing trilinear interpolation and the amount of geometry required. An interleaved slice rendering algorithm according to an embodiment of the invention has a reduced number of texture fetches, a reduced number of operations (cycles) required for trilinear interpolation, a reduced amount of geometry required, and requires fewer texture switches in z. A rendering method according to an embodiment of the invention can also reduce the computational overhead, particularly the cost of performing trilinear interpolations as well as reducing the amount of geometry required. Tri-linear interpolation can be performed by first performing two bilinear interpolations on opposing faces of a volume element, and then interpolating between the results of bilinear interpolation.

According to an aspect of the invention, there is provided a method for volume rendering including the steps of providing a digitized 3-dimensional image comprising a plurality of 2-dimensional slices comprising a plurality of intensities corresponding to a domain of points on a 2-dimensional grid, interleaving said slices wherein a predetermined number of slices are represented within 2-dimensional textures comprising slabs, each said slab comprising a plurality of polygons, generating weighting functions for each slice of a polygon of a slab, and using said weighting functions to compute a trilinearly interpolated sample from multiple bilinearly interpolated samples value for each slice of said polygon.

According to a further aspect of the invention, the trilinarly interpolated samples are computed in parallel for each slice of said polygon.

According to a further aspect of the invention, the method includes sorting said slabs into a rendering order.

According to a further aspect of the invention, each slab comprises 4 slices.

According to a further aspect of the invention, interleaving said slices comprises ordering points $v_{ijk}$ as $\ldots v_{i,j,k}, v_{i,j,k+1}, v_{i,j,k+2}, v_{i,j,k+3},$ $v_{i,j+1,k}, v_{i,j+1,k+1}, v_{i,j+1,k+2}, v_{i,j+1,k+3},$ $v_{i,j+2,k}, v_{i,j+2,k+1}, v_{i,j+2,k+2}, v_{i,j+2,k+3},$ $v_{i,j+3,k}, v_{i,j+3,k+1}, v_{i,j+3,k+2}, v_{i,j+3,k+3}, \ldots,$ wherein i is a row index, j is a column index, and k is a slice index.

According to a further aspect of the invention, trilinear interpolation comprises obtaining a dot product of said weighting functions with bilinearly interpolated sample values for each said slice of said polygon.

According to a further aspect of the invention, a weighting function is associated with each slice of said polygon.

According to a further aspect of the invention, the method includes rendering said image by generating weighting functions for each polygon of each slab and trilinearly interpolating sample values for each said polygon.

According to a further aspect of the invention, wherein if, after interleaving said slices, there is a slab with fewer than four slices, inserting empty slices into said slab.

According to a further aspect of the invention, the interpolator function is generated by summing a primary function and a secondary function, wherein said primary function is a line segment whose range is clamped to the range [0,1], and said secondary function is a line segment whose range is clamped to the range [−1,0].

According to another aspect of the invention, there is provided a program storage device readable by a computer, tan-

DETAILED DESCRIPTION OF THE EXEMPLARY EMBODIMENTS

Exemplary embodiments of the invention as described herein generally include systems and methods for interleaving slices in texture memory to compute multiple trilinear interpolations in parallel by exploiting parallelism in graphics hardware. A rendering method according to an embodiment of the invention reduces the total number of texture fetches by a factor of 2, the number of operations (cycles) to compute trilinear interpolation by a factor of 2, the number of texture switches by a factor of 3, and the amount of geometry required by a factor of 3. An aspect of these reductions is the decrease in the number of texture fetches.

As used herein, the term "image" refers to multi-dimensional data composed of discrete image elements. The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 1:
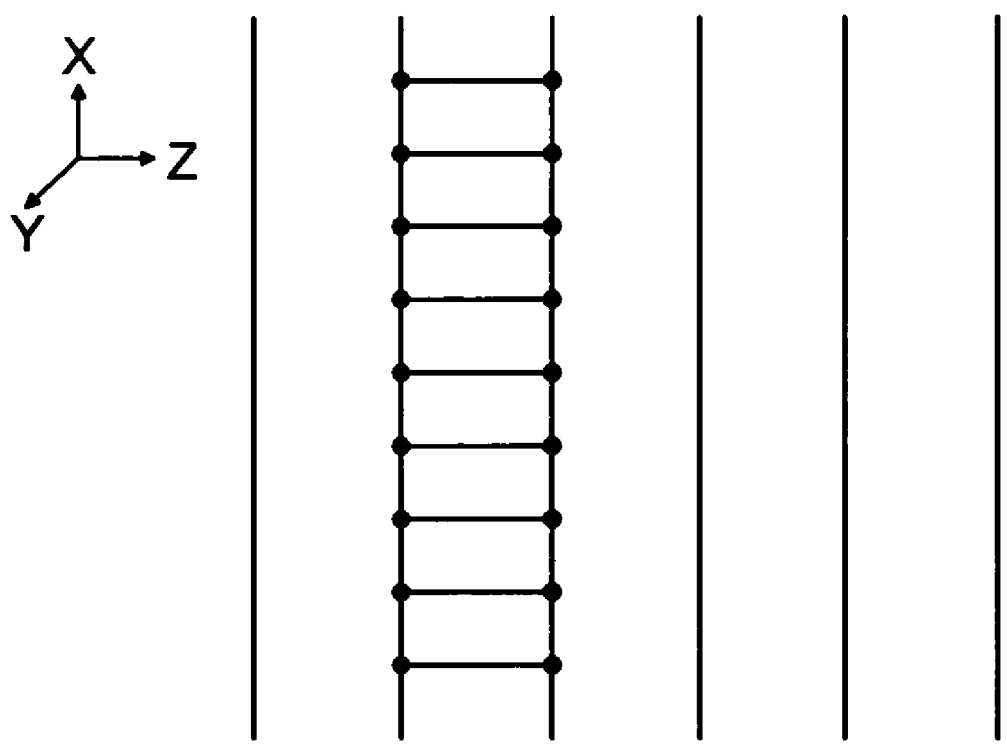
FIG. 1 illustrates the basic sliding texture algorithm, according to an embodiment of the invention.
Figure 2:
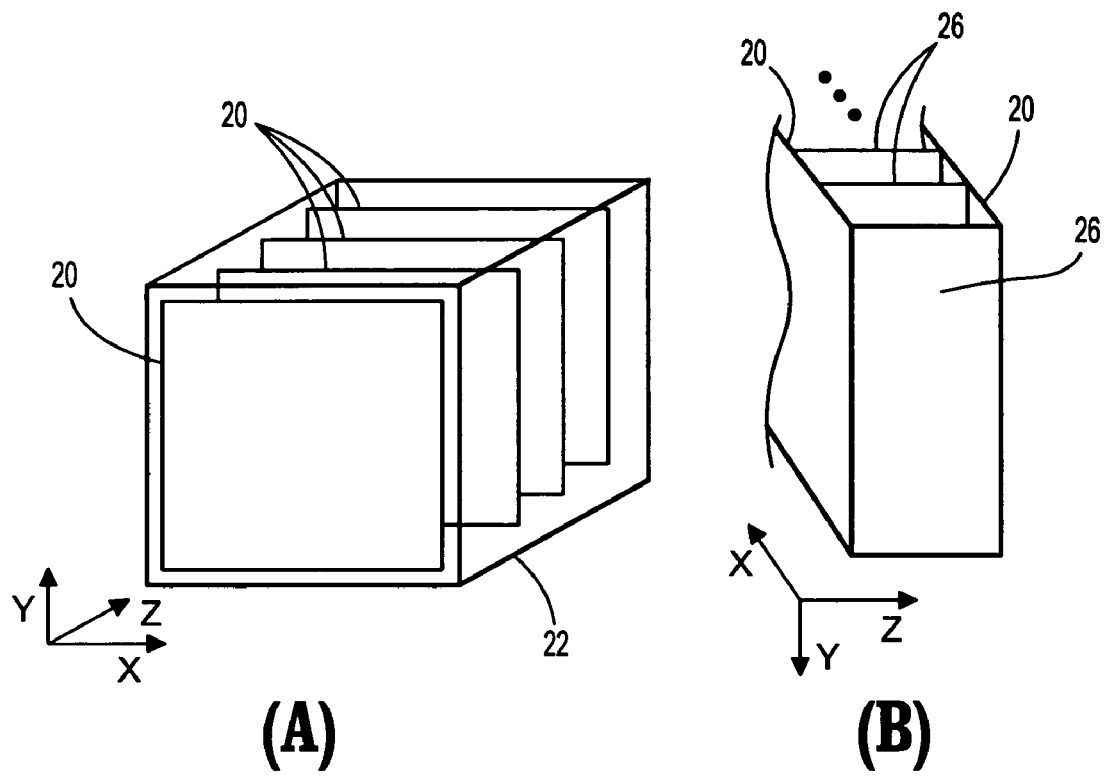
FIGS. 2(A)-(B) are graphical representations of an array of two dimensional images representing a volume, according to an embodiment of the invention.

FIG. 2(a) depicts a plurality of two dimensional images 20 representing a volume 22. The two dimensional images are textures in a three-dimensional volume array of data assembled from a regular succession of adjacent images 20 through the body being scanned. Each image 20 is a two-dimensional image array of data points. Each grid value of a two-dimensional image 20 is a picture element, or "pixel". Each grid value of the three-dimensional volume array is called a volume element, or "voxel". The three-dimensional volume array is obtainable from magnetic resonance (MR) imaging systems, computed tomography (CT) scanning systems, positron emission tomography (PET), x-ray, ultrasound scanning or other systems. Alternatively or additionally, the volume array is obtained from a memory, database, network, input connection or other source.

The two dimensional images 20 are generally represented at a first orientation, such as being substantially orthogonal to a z-axis or dimension. If the volume 22 is viewed along an x- or y-axis or dimension, the two dimensional images 20 appear substantially as lines. The images 20 can have uniform or non-uniform spacing. For example, the distance between each adjacent pair of images 20 varies or is the same. As shown, the images 20 are in parallel planes. In other embodiments, the images 20 are in intersecting planes that intersect within or outside of the volume 22, such as associated with a scan of the volume 22 performed by rotating the scanner about an axis. The images 20 can have a same or different scaling. For example, some images 20 are acquired with a lesser resolution, such as images 20 at the extremities of the volume 22. Other images 20 are acquired with a higher resolution, such as images 20 intersecting a region of interest in the volume 22.

FIG. 2(B) illustrates how texture data is interpolated for a polygon 26 with vertices on the edges of the images 20. The image data along the edges is selected. For each location on the polygon 26 to have data, the data values from the two nearest locations on the edges of the images 20 (intersection of the polygon 26 with the images 20) are interpolated with weights. The weights represent the relative contribution of each image 20 to the interpolation, such as being a function of distance from the data location on the polygon 26.

Figure 3:
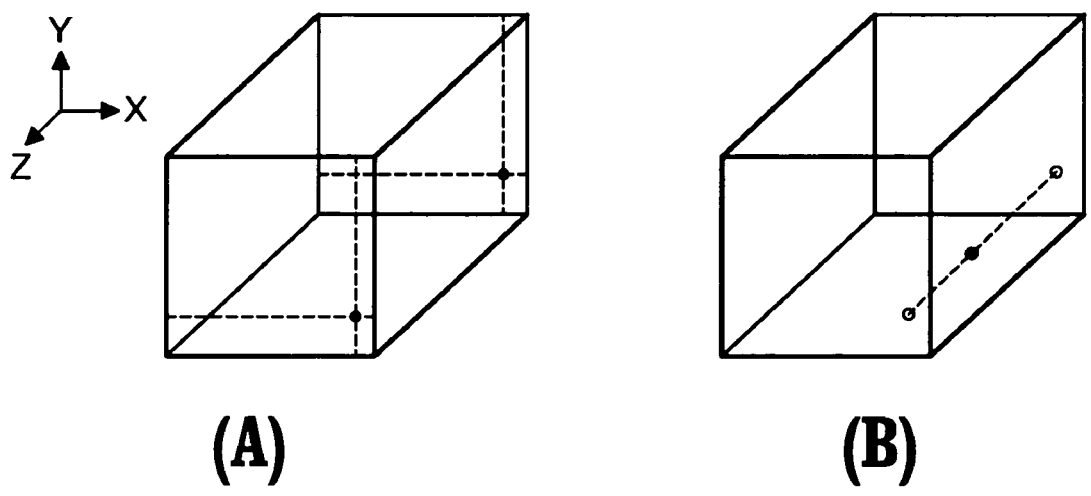
FIGS. 3(A)-(B) illustrates how trilinear interpolation can be obtained from a pair of bilinear interpolations and a subsequent linear interpolation of the results, according to an embodiment of the invention.

FIGS. 3(A)-(B) illustrates how trilinear interpolation can be obtained from a pair of bilinear interpolations and a subsequent linear interpolation of the results. The pixel boundaries are shown with solid lines, with the nearest pixel having a heavier boundary. If the 8 vertices of a polygon are denoted by coordinates (0,0,0), (0,0,1), (0,1,0), ... (1,1,1), and the values at each vertex are denoted $V_{000}, V_{100}, V_{010}, \ldots, V_{111}$, then the value at position (x,y,z) within the polygon, denoted $V_{xyz}$, is given by $$V_{xyz} = V_{000}(1-x)(1-y)(1-z) + V_{100}x(1-y)(1-z) + V_{010}(1-x)y(1-z) + V_{001}(1-x)(1-y)z + V_{101}x(1-y)z + V_{011}(1-x)yz + V_{110}xy(1-z) + V_{111}xyz.$$

Bilinear interpolations in the X and Y planes is depicted in FIG. 3(A) using dashed lines. The trilinear interpolation is based on the results of the bilinear interpolation, as indicated by the dashed lines in FIG. 3(B).

Figure 4:
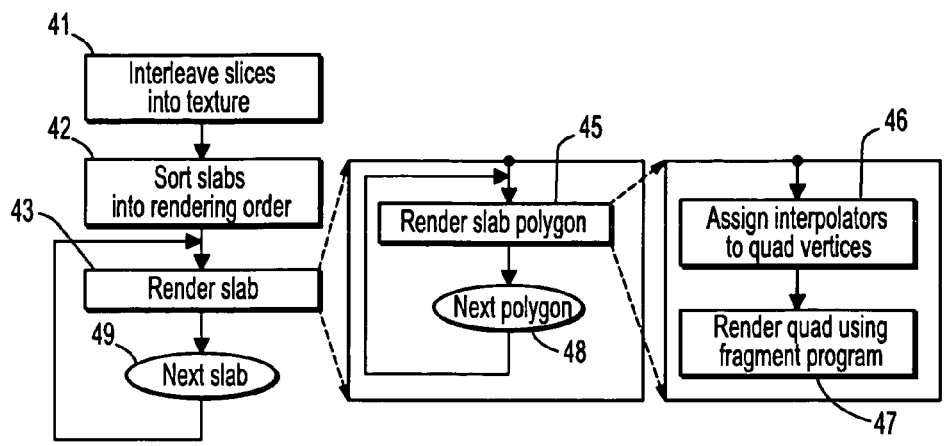
FIG. 4 presents a flow chart of an interleaved slice volume rendering algorithm, according to an embodiment of the invention.

FIG. 4 presents a flow chart of an interleaved slice volume rendering algorithm, according to an embodiment of the invention. Boxes with dotted lines denote decompositions of method steps whose scope is denoted by the dashed arrows that point to it. Details of the steps summarized herein are described below. A plurality of two dimensional textures 20 is obtained, as depicted in FIGS. 2(A)-(B). A subset of the volume array 22 is loaded into a memory or processor. Each subset can include any number of the two dimensional texture images, such as immediately adjacent pairs. For each subset of images, the space between the current adjacent images (a slab) is to be rasterized. In a preprocessing step 41, slices are interleaved wherein four slices are represented within a 2D texture, where the space bounded by the four slices is called a slab. Note that the definition of a slab as used herein is changed from the definition in "Sliding Texture Volume Rendering" so that a slab is three times larger. The increased width of the slab by a factor of three accounts for the three fold decrease in the amount of geometry required. Slabs are sorted at step 42 into rendering order: that is, either back-to-front or front-to-back. The sorting is implicit in that it is effectively determined by the order that the slabs are processed.

Each slab is rendered at step 43 and the process loops at step 49 until all slabs have been processed. Special end conditions are described in greater detail below. A slab includes multiple slab polygons. A plurality of slabs and associated polygons are sequentially identified for different subsets of the images 20, which are in turn rendered independently at step 45. The process loops at step 48 until all polygons have been processed.

The polygons in turn are OpenGL® (OpenGL® is a trademark owned by Silicon Graphics, Inc.) quads. Texture data is generated for each polygon 26 of a slab. The texture data represents a region, the polygon 26, between two dimensional textures. The texture data is generated by interpolation from data of the two dimensional textures intersecting the polygon 26. The texture data for each polygon of the slab is bi-linearly interpolated from the volume using 2D-texture coordinates. Those two bi-linearly interpolated values are weighted using the interpolated third-texture coordinate. This results in a tri-linear interpolated or rendered volume sample. The quad coordinates are used to generate at step 46 interpolator or weighting functions that can simultaneously weight four bilinear interpolations to obtain a trilinear interpolated sample. Each quad vertex is associated with an interpolator function. The program applies simple computations to these coordinates to generate piece-wise linear interpolation weighting functions. The interpolation functions are used to compute trilinear interpolations in parallel to yield a sampled value from the texture, which is used at step 47 to render the quad using the fragment program.

The texture data of the polygons 26 is used to render a portion of the three dimensional representation of the volume 22. Each slab is rendered. The rendering of a slab corresponds to rendering one area of the three dimensional representation. The area corresponds to the volume between the images 20 defining the slab. The polygons 26 define the extent of the slab and resulting area being rendered.

Interleaved Texture Representation

The interleaving of slices into texture, performed at step 41 of FIG. 4, will now be explained. Texture comprises a regular array of texture elements (texels) with the same representation or texture format. The sliding texture algorithm used 2D texture with a format of luminance, wherein each texel comprised a single value, or single channel, denoting luminance. Graphical processing units (GPUs) typically support up to 4 channels for representation of color in an RGBA (red-green-blue-alpha) format. These extra channels can be exploited to render multiple (up to 4) gray-level slices in parallel. Multiple values, or channels, can be encoded per texel using different formats supported by the GPU, such as LA (luminance alpha) for two channels, RGB (red-green-blue) for three channels, and RGBA (red-green-blue-alpha) for 4 channels.

Figure 5:
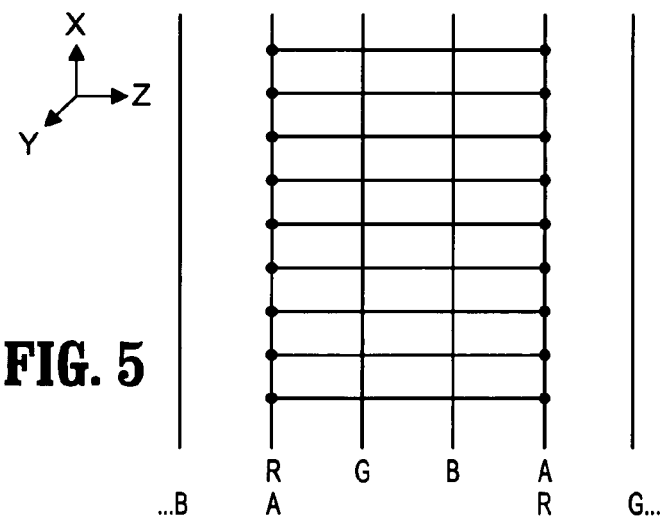
FIG. 5 illustrates how using multiple channels per texel facilitates parallelizing the sliding texture algorithm, according to an embodiment of the invention.

FIG. 5 illustrates how using multiple channels per texel facilitates parallelizing the sliding texture algorithm. FIG. 5 represents a logical view because the channels are embedded within the 2D texture, wherein four slices are represented in a single 2D texture with four channels (RGBA).

A 2D texture is usually represented internally as a 1D sequence of texels in row-major order:

$$\text{slice}_k: \ldots v_{i,j}, v_{i,j+1}, v_{i,j+2}, v_{i,j+3}, \ldots$$

$$\text{slice}_{k+1}: \ldots v_{i,j}, v_{i,j+1}, v_{i,j+2}, v_{i,j+3}, \ldots$$

$$\text{slice}_{k+2}: \ldots v_{i,j}, v_{i,j+1}, v_{i,j+2}, v_{i,j+3}, \ldots$$

$$\text{slice}_{k+3}: \ldots v_{i,j}, v_{i,j+1}, v_{i,j+2}, v_{i,j+3}, \ldots$$

This can be re-expressed in a 3D form as:

$$\ldots v_{i,j,k}, v_{i,j+1,k}, v_{i,j+2,k}, v_{i,j+3,k} \ldots$$

$$\ldots v_{i,j,k+1}, v_{i,j+1,k+1}, v_{i,j+2,k+1}, v_{i,j+3,k+1}, \ldots$$

$$\ldots v_{i,j,k+2}, v_{i,j+1,k+2}, v_{i,j+2,k+2}, v_{i,j+3,k+2}, \ldots$$

$$\ldots v_{i,j,k+3}, v_{i,j+1,k+3}, v_{i,j+2,k+3}, v_{i,j+3,k+3}, \ldots$$

Combining the values from four slices into a single texel (with four channels) yields:

$$\ldots v_{i,j,k}, v_{i,j,k+1}, v_{i,j,k+2}, v_{i,j,k+3},$$

$$v_{i,j+1,k}, v_{i,j+1,k+1}, v_{i,j+1,k+2}, v_{i,j+1,k+3},$$

$$v_{i,j+2,k}, v_{i,j+2,k+1}, v_{i,j+2,k+2}, v_{i,j+2,k+3},$$

$$v_{i,j+3,k}, v_{i,j+3,k+1}, v_{i,j+3,k+2}, v_{i,j+3,k+3}, \ldots,$$

which is an interleaved representation of the slices.

According to an embodiment of the invention, four bi-linearly interpolated values are accessed with a single texture fetch. This is more efficient because a texture fetch is a relatively expensive operation. Furthermore, as explained below, all channels are interpolated simultaneously and independently by the graphics hardware thereby providing a performance increase by a factor of 3. These last two features, improved memory access and interpolation, can provide a faster approach for trilinear interpolation. An interleaved representation also reduces the amount of geometry required by a factor of 3. To ensure continuity the last channel is replicated, wherein the last channel of texel$_{i,j}$ for slab k is the first channel of texel$_{i,j}$ for slab k+1. This overhead suggests using as many channels per texel as possible.

Interpolating Multiple Slices in Parallel

How trilinear interpolation is performed with interleaved texture representation will now be explained. Note that most GPUs include several stages or sub-units, including a vertex stage for processing polygon vertices, and a fragment stage for processing groups of pixels, referred to as fragments, such as interiors of polygons. In performing a trilinear interpolation, it is desired to avoid the use of if-tests to determine how to process points in between slices as represented by the channels.

Figure 6:
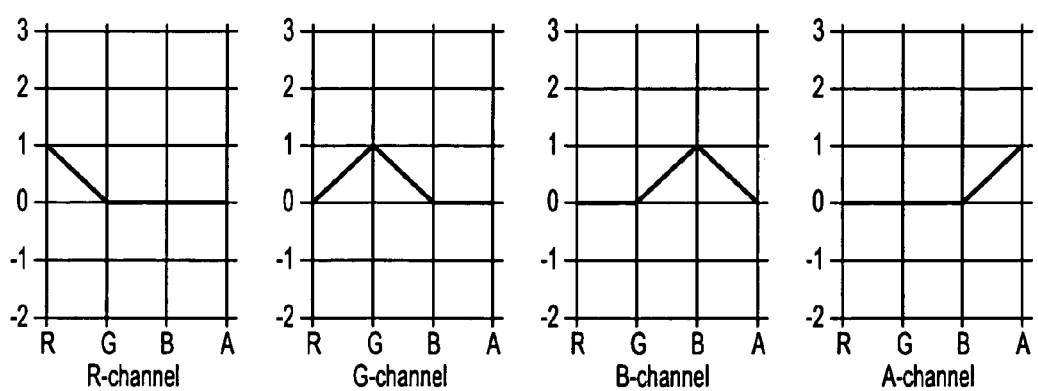
FIG. 6 depicts the functions to isolate the interpolation of interleaved values so computations can be performed in parallel, according to an embodiment of the invention.
Figure 7:
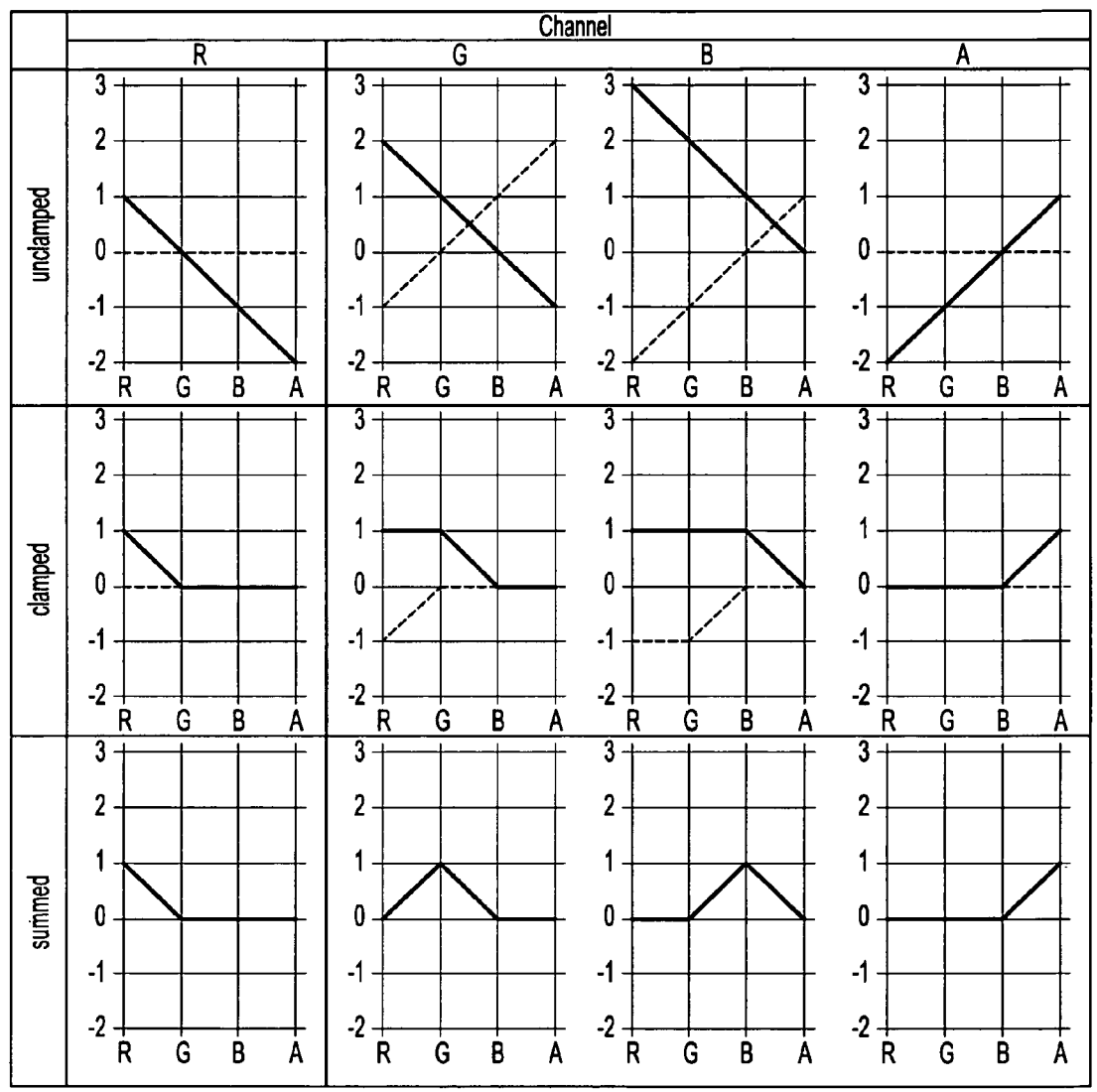
FIG. 7 illustrates the derivation of the functions used to perform interpolations of four channels in parallel, according to an embodiment of the invention.

According to an embodiment of the invention, a piece-wise linear weighting function is defined for each channel that appropriately weights each point in the interior of a polygon by its distance from one of the slices. FIG. 6 depicts graphs of weighting functions according to an embodiment of the invention for each of the R, G, B, and A channels to isolate the interpolation of interleaved values so computations can be performed in parallel. FIG. 7 illustrates the derivation of the 4-channel weighting functions used to perform interpolations of four RGBA channels in parallel, according to an embodiment of the invention. A derivation of the weighting functions includes three steps, chronologically ordered by the rows of FIG. 7, isolating the effect in each channel, as represented by each column. According to an embodiment of the invention, each 4-channel weighting function is generated from a pair of linear functions, one for each channel, referred to as the primary (or additive) vectors, and the secondary (or subtractive) vectors, represented by the line segments in the top row of FIG. 7. The end points of the primary vectors can be represented by the following pair of vectors:

$$\begin{pmatrix} 1 \\ 2 \\ 3 \\ -2 \end{pmatrix}, \begin{pmatrix} -2 \\ -1 \\ 0 \\ 1 \end{pmatrix},$$

and similarly, the endpoints of the secondary vectors can be represented by:

$$\begin{pmatrix} 0 \\ -1 \\ -2 \\ 0 \end{pmatrix}, \begin{pmatrix} 0 \\ 2 \\ 1 \\ 0 \end{pmatrix}$$

where each vector component corresponds to one channel. In a first step, values of the line segments between these end points displayed in the top row of FIG. 7 are linearly interpolated inside the line segment by the vertex stage. The primary vector is represented by a solid line segment, whereas the secondary vector is represented by a dashed line segment.

The vectors are converted into piece-wise linear functions by clamping and summing in the fragment stage. In a second step, the primary and secondary vectors are clamped, as illustrated in the second row of FIG. 7. The primary vector is clamped using [0,1], whereas the secondary vector is clamped using [−1,0]. In a third step, the clamped primary and secondary vectors are summed, as illustrated in the third row of FIG. 7. The graphs of this row correspond to the graphs of the 4-channel weighting functions depicted in FIG. 6. Note that clamping and summing are basic graphics operations that can execute in a single cycle.

The fragment stage of the hardware automatically interpolates 2D samples for each channel when fetching samples. Trilinear interpolation involves interpolating the results from these 2D interpolations. The trilinear interpolation computation can be performed in parallel using the dot product of bilinearly interpolated 2D sample values and the values of the 4-channel weighting functions. The piece-wise linear nature of the interpolation function serves to isolate channels in parallel to yield a trilinear interpolation.

The following exemplary OpenGL® (available from Silicon Graphics, Inc.) graphics system fragment program shows how the computation can be performed:

```
uniform sampler2D slab; // slab comprising 4 slices
uniform sampler1D lut;
// lookup table representing transfer function varying vec4
    texCoord; // texture coordinate varying vec4 primary;
// additive component of the interpolator function varying
    vec4 secondary;
// subtractive component of the interpolator function void
    main( )
{
    primary = clamp(primary, 0, 1);
    // clamp the primary linear function to between
    // 0 and 1 inclusive
    secondary = clamp(secondary, -1, 0);
    // clamp the secondary linear function to
    // between -1 and 0 inclusive.
    vec4 function = primary + secondary;
    // generate interpolator function
    float data =
        dot(texture2D(volume, texCoord0.xy), function);
    // apply four interpolators across all
    // channels simultaneously
    // the texture2D call fetches the 2D samples and
    //    performs   bilinear   interpolation   on   them
        gl_FragColor=texture1D(lut, data);
    // assign fragment color
}
```

The last function call is used to map intensity values to color values for improved visualization of the trilinear interpolation result.

It is to be understood that the preceding description in terms of 4 channels is exemplary and non-limiting. According to other embodiments of the invention, it is possible to interleave 2 neighboring slices in a LUMINANCE_ALPHA texture or 3 adjacent slices in a RGB texture on current GPUs. It is also possible to interleave more than 4 slices if the hardware supports a format with more than 4 channels and supports more than 4 simultaneous bilinear interpolations.

Special Cases

Special cases are used when the number of slices is such that there are not four slices in the last set of slices. The simplest approach is to insert empty slices to provide a full complement of slices. An alternative, but potentially more efficient approach, is to only render the necessary channels, which can be accomplished by changing how the geometry is used and/or the interpolator functions. Furthermore, the last section can use a different format with fewer channels.

Analysis

The following table presents results of an analysis that compares the cost to perform a trilinear interpolation according to an embodiment of the invention with the original sliding texture algorithm, where fractional operations are used for the interleaved algorithm to reflect the normalized result from parallelization, and ignoring special handling for the last few slices.

| Operation | Original Algorithm | Interleaved Algorithm |
| --- | --- | --- |
| Texture fetch | 2 | 1 |
| Addition | 0 | 1 |
| Clamp | 0 | 2 |
| Dot product | 1 | 1 |

Operations such as multiplication and dot product can be performed in a single cycle, whereas texture fetches can be more expensive. These factors are significant given the number of trilinear interpolations that are performed. However, the difference is the reduced number of texture fetches required according to an embodiment of the invention, due to their relative expense. A drawback with an embodiment of the invention is that an extra slice must be loaded for each interleaved unit to ensure continuity. With four-channels per texel there is essentially an overhead of one-fourth the total number of slices that must be loaded during each rendering cycle when the slices are not, or cannot, be stored within the graphics hardware. This is significant because uploading texture from the host to the graphics hardware is a slow operation. However, with advances in local buses this overhead will decrease.

Additional Optimizations

Compression domain rendering is possible using the S3 texture compression, disclosed in U.S. Pat. No. 5,956,431 (Iourcha, et al.), which enables compressed data to be loaded thereby reducing the cost of transferring data from the host to the graphics hardware. The S3 compression is built into nVidia graphics hardware and therefore has no overhead. However, S3 compression has some caveats. First, it currently only applies to 8-bit data, although data can be quantized before compression without a significant reduction is quality. Second, the alpha channel is treated differently from the RGB channels.

Implementation

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 8:
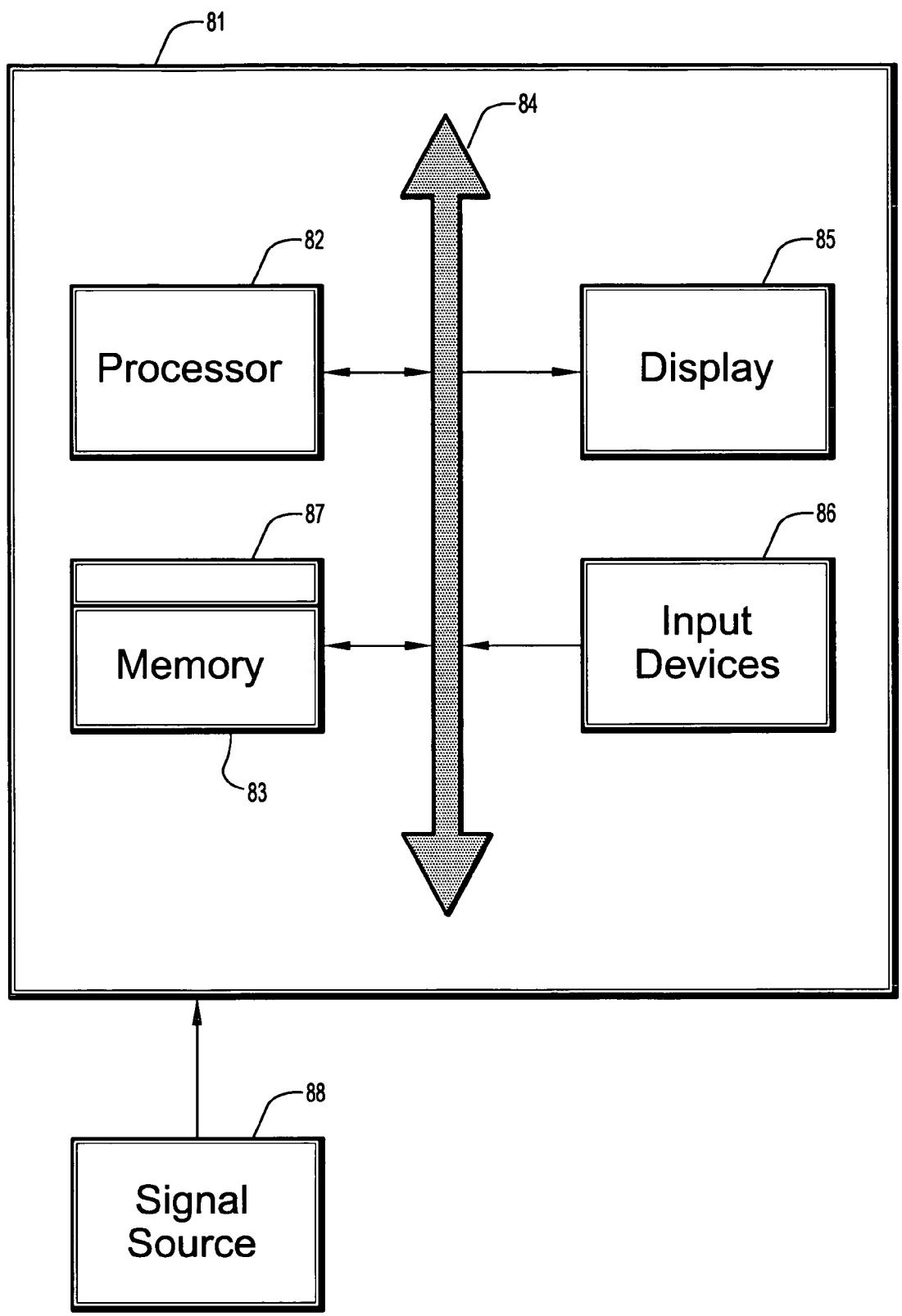
FIG. 8 is a block diagram of an exemplary computer system for implementing an interleaved slice volume rendering scheme according to an embodiment of the invention.

FIG. 8 is a block diagram of an exemplary computer system for implementing a interleaved slice volume rendering scheme according to an embodiment of the invention. Referring now to FIG. 8, a computer system 81 for implementing the present invention can comprise, inter alia, a processor 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by processor 82 to process the signal from the signal source 88. As such, the computer system 81 is a general purpose computer system that becomes a specific purpose computer system when executing the routine 87 of the present invention.

The processor 82 is a general processor, digital signal processor, application specific integrated circuit, field programmable gate array, graphics processor unit, central processing unit, analog circuit, digital circuit, combinations thereof, multiple processors, network or other now known or later developed processor. In one embodiment, the processor 82 and the memory 83 are part of a graphics processing unit, such as a graphics card operable pursuant to OpenGL, DirectX, or other graphical data rendering languages. The processor 82 is operable to tri-linearly interpolate data from the different subsets of two dimensional textures stored in the memory 83.

The computer system 81 can also include an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for volume rendering, the method performed by said computer comprising the steps of:

providing a digitized 3-dimensional image comprising a plurality of 2-dimensional slices comprising a plurality of intensities corresponding to a domain of points on a 2-dimensional grid;

interleaving said slices wherein a predetermined number of slices are represented within 2-dimensional textures comprising slabs, each said slab comprising a plurality of polygons, wherein each slab comprises 4 slices, wherein interleaving said slices comprises ordering points $v_{ijk}$ as $\ldots v_{i,j,k}, v_{i,j,k+1}, v_{i,j,k+2}, v_{i,j,k+3},$ $v_{i,j+1,k}, v_{i,j+1,k+1}, v_{i,j+1,k+2}, v_{i,j+1,k+3},$ $v_{i,j+2,k}, v_{i,j+2,k+1}, v_{i,j+2,k+2}, v_{i,j+2,k+3},$ $v_{i,j+3,k}, v_{i,j+3,k+1}, v_{i,j+3,k+2}, v_{i,j+3,k+3}, \ldots,$ wherein i is a row index, j is a column index, and k is a slice index;

generating weighting functions for each slice of a polygon of a slab; and using said weighting functions to compute a trilinearly interpolated sample from multiple bilinearly interpolated samples value for each slice of said polygon, wherein said interpolator function is generated by summing a primary function and a secondary function, wherein said primary function is a line segment whose range is clamped to the range [0,1], and said secondary function is a line segment whose range is clamped to the range [−1,0], wherein said volume rendering is performed by a graphical processing unit.

2. The method of claim 1, wherein said trilinearly interpolated samples are computed in parallel for each slice of said polygon.

3. The method of claim 1, further comprising sorting said slabs into a rendering order.

4. The method of claim 1, wherein trilinear interpolation comprises obtaining a dot product of said weighting functions with bilinearly interpolated sample values for each said slice of said polygon.

5. The method of claim 1, wherein a weighting function is associated with each slice of said polygon.

6. The method of claim 1, comprising rendering said image by generating weighting functions for each polygon of each slab and trilinearly interpolating sample values for each said polygon.

7. The method of claim 1, wherein if, after interleaving said slices, there is a slab with fewer than four slices, inserting one or more empty slices into said slab.

8. A computer implemented method for volume rendering, the method performed by said computer comprising the steps of:

provycling a plurality of slabs for rendering, each slab comprising a predetermined number of sequential slices, each slice comprising a plurality of intensities corresponding to a domain of points on a 2-dimensional grid, wherein each slab is represented by a plurality of polygons;

interleaving said slices wherein points $v_{ijk}$ are ordered as $$\ldots v_{i,j,k}, v_{i,j,k+1}, v_{i,j,k+2}, v_{i,j,k+3},$$

$$v_{i,j+1,k}, v_{i,j+1,k+1}, v_{i,j+1,k+2}, v_{i,j+1,k+3},$$

$$v_{i,j+2,k}, v_{i,j+2,k+1}, v_{i,j+2,k+2}, v_{i,j+2,k+3},$$

$$v_{i,j+3,k}, v_{i,j+3,k+1}, v_{i,j+3,k+2}, v_{i,j+3,k+3}, \ldots,$$

wherein i is a row index, i is a column index, and k is a slice index;

providing a pair of linear functions for each slice of each slab, said pair comprising a primary function and a secondary function;

for each slice, clamping the range of said primary function to the range [0,1], and clamping the range of said secondary function to the range [−1,0];

summing the clamped primary function and the clamped secondary function for each slice to form a weighting function for said slice;

fetching and interpolating intensity samples for a polygon in a slab; and trilinearly interpolating said intensity samples by performing a dot product of the intensity samples with said weighting function for each slice wherein said volume rendering is performed by a graphical processing unit.

9. The method of claim 8, wherein rendering said image comprises trilinearly interpolating samples from each polygon of each slab in said plurality of slices.

10. The method of claim 8, wherein said dot product of the intensity samples and said weighting function is performed in parallel for each slice.

11. A program storage device readable by a computer, tangibly embodying a program of instructions executable by the computer to perform method steps for volume rendering, said method comprising the steps of:

providing a digitized 3-dimensional image comprising a plurality of 2-dimensional slices comprising a plurality of intensities corresponding to a domain of points on a 2-dimensional grid;

interleaving said slices wherein a predetermined number of slices are represented within 2-dimensional textures comprising slabs, each said slab comprising a plurality of polygons, wherein each slab comprises 4 slices and interleaving said slices comprises ordering points $v_{ijk}$ as $$\ldots v_{i,j,k}, v_{i,j,k+1}, v_{i,j,k+2}, v_{i,j,k+3},$$

$$v_{i,j+1,k}, v_{i,j+1,k+1}, v_{i,j+1,k+2}, v_{i,j+1,k+3},$$

$$v_{i,j+2,k}, v_{i,j+2,k+1}, v_{i,j+2,k+2}, v_{i,j+2,k+3},$$

$$v_{i,j+3,k}, v_{i,j+3,k+1}, v_{i,j+3,k+2}, v_{i,j+3,k+3}, \ldots,$$

wherein i is a row index, j is a column index, and k is a slice index;

generating weighting functions for each slice of a polygon of a slab; and using said weighting functions to compute a trilinearly interpolated sample from multiple bilinearly interpolated samples value for each slice of said polygon, wherein said interpolator function is generated by summing a primary function and a secondary function, wherein said primary function is a line segment whose range is clamped to the range [0,1], and said secondary function is a line segment whose range is clamped to the range [−1,0].

12. The computer readable program storage device of claim 11, wherein said trilinearly interpolated samples are computed in parallel for each slice of said polygon.

13. The computer readable program storage device of claim 11, the method further comprising sorting said slabs into a rendering order.

14. The computer readable program storage device of claim 11, wherein trilinear interpolation comprises obtaining a dot product of said weighting functions with bilinearly interpolated sample values for each said slice of said polygon.

15. The computer readable program storage device of claim 11, wherein a weighting function is associated with each slice of said polygon.

16. The computer readable program storage device of claim 11, the method comprising rendering said image by generating weighting functions for each polygon of each slab and trilinearly interpolating sample values for each said polygon.

17. The computer readable program storage device of claim 11, wherein if, after interleaving said slices, there is a slab with fewer than four slices, inserting one or more empty slices into said slab.

* * * * *

UNITED STATES PATENT AND TRADEMARK OFFICE
CERTIFICATE OF CORRECTION

PATENT NO.        : 7,616,199 B2                                    Page 1 of 1
APPLICATION NO.   : 11/481129
DATED             : November 10, 2009
INVENTOR(S)       : Klaus Engel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Nineteenth Day of October, 2010

David J. Kappos
*Director of the United States Patent and Trademark Office*